(12) United States Patent
Yamane et al.

(10) Patent No.: US 10,202,042 B2
(45) Date of Patent: Feb. 12, 2019

(54) ELECTRIC VEHICLE POWER CONVERSION SYSTEM

(71) Applicant: SAMSUNG SDI CO., LTD., Yongin-si, Gyeonggi-do (KR)

(72) Inventors: Futoshi Yamane, Yokohama (JP); Masami Ishikawa, Yokohama (JP); Mitsutoshi Muraoka, Yokohama (JP); Taro Yoshida, Yokohama (JP); Yoshinari Murayama, Yokohama (JP); Kenji Furusawa, Yokohama (JP)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1030 days.

(21) Appl. No.: 14/477,241

(22) Filed: Sep. 4, 2014

(65) Prior Publication Data

US 2015/0097426 A1   Apr. 9, 2015

(30) Foreign Application Priority Data

Oct. 4, 2013  (JP) .................................. 2013-208866
Apr. 7, 2014  (KR) ......................... 10-2014-0041286

(51) Int. Cl.
  *B60L 11/00*   (2006.01)
  *B60L 15/02*   (2006.01)
  (Continued)

(52) U.S. Cl.
  CPC ............. *B60L 11/005* (2013.01); *B60L 3/003* (2013.01); *B60L 3/0007* (2013.01);
  (Continued)

(58) Field of Classification Search
  CPC .... B60L 11/005; B60L 11/1803; B60L 15/02; B60L 3/0007; B60L 3/0023; B60L 3/003;
  (Continued)

(56) References Cited

U.S. PATENT DOCUMENTS 5,994,789 A * 11/1999 Ochiai ................ B60L 11/1803
                                                   180/65.1
6,002,221 A    12/1999 Ochiai et al.
(Continued)

FOREIGN PATENT DOCUMENTS

DE   10 2012 204 866 A1   10/2013
EP        2 284 982 A1    2/2011
(Continued)

OTHER PUBLICATIONS

Office Action dated Jan. 23, 2017, of the corresponding European Patent Application No. 14187640.9.
(Continued)

*Primary Examiner* — Thienvu Tran
*Assistant Examiner* — Brian K Baxter
(74) *Attorney, Agent, or Firm* — Lee & Morse, P.C.

(57) ABSTRACT

A power conversion system includes a controller to control discharge of a smoothing condenser based on at least one signal received through an input. The at least one signal indicates a failure of a discharge circuit configured to discharge the smoothing condenser The controller controls discharge of stored charge in the smoothing condenser through parasitic resistance components of a power system which includes the smoothing condenser. The power conversion system may be used with an electric vehicle.

13 Claims, 5 Drawing Sheets

(51) Int. Cl.
  *H02J 7/00* (2006.01)
  *B60L 11/18* (2006.01)
  *B60L 3/00* (2006.01)
  *B60L 3/04* (2006.01)
  *B60L 3/12* (2006.01)
  *H02H 7/16* (2006.01)
  *H02M 1/32* (2007.01)

(52) U.S. Cl.
  CPC ........... *B60L 3/0023* (2013.01); *B60L 3/0046* (2013.01); *B60L 3/0092* (2013.01); *B60L 3/04* (2013.01); *B60L 3/12* (2013.01); *B60L 11/1803* (2013.01); *B60L 15/02* (2013.01); *H02H 7/16* (2013.01); *H02J 7/0072* (2013.01); *B60L 2210/40* (2013.01); *H02M 2001/322* (2013.01); *Y02T 10/7005* (2013.01); *Y02T 10/7241* (2013.01)

(58) Field of Classification Search
  CPC ........ B60L 3/0046; B60L 3/0092; B60L 3/04; B60L 3/12; B60L 2210/40; H02H 7/16; H02J 7/0072; H02M 2001/322; Y02T 10/7005; Y02T 10/7241
  USPC .......................................................... 307/101
  See application file for complete search history.

(56) References Cited

U.S. PATENT DOCUMENTS

| | | | | |
|---|---|---|---|---|
| 2010/0033011 A1* | 2/2010 | Okazaki | | B60L 7/12 307/9.1 |
| 2010/0244558 A1* | 9/2010 | Mitsutani | | B60K 6/365 307/9.1 |
| 2011/0040436 A1* | 2/2011 | Yamamoto | | B60L 11/1861 701/22 |
| 2011/0077812 A1* | 3/2011 | Ichikawa | | B60W 10/26 701/22 |
| 2011/0087395 A1* | 4/2011 | Yamamoto | | B60K 6/445 701/22 |
| 2011/0178664 A1* | 7/2011 | Yamamoto | | B60W 20/13 701/22 |
| 2011/0208383 A1* | 8/2011 | Yamamoto | | B60W 20/13 701/22 |
| 2011/0251745 A1* | 10/2011 | Yamamoto | | B60W 20/13 701/22 |
| 2011/0257825 A1* | 10/2011 | Yamamoto | | B60L 3/0092 701/22 |
| 2012/0010771 A1* | 1/2012 | Kato | | B60W 20/10 701/22 |
| 2012/0013184 A1* | 1/2012 | Kato | | B60W 20/13 307/9.1 |
| 2012/0022738 A1* | 1/2012 | Kato | | B60W 20/13 701/22 |
| 2012/0049773 A1* | 3/2012 | Muraho | | H02P 27/06 318/400.3 |
| 2012/0065827 A1* | 3/2012 | Kimura | | B60L 11/1811 701/22 |
| 2012/0089290 A1* | 4/2012 | Kato | | B60W 20/10 701/22 |
| 2012/0109442 A1* | 5/2012 | Kato | | B60W 10/26 701/22 |
| 2012/0229061 A1* | 9/2012 | Itoh | | B60L 3/003 318/400.3 |
| 2013/0003429 A1 | 1/2013 | Murahashi | | |
| 2013/0039108 A1 | 2/2013 | Watanabe et al. | | |
| 2013/0257446 A1* | 10/2013 | Soell | | B60L 11/1803 324/503 |
| 2013/0268158 A1* | 10/2013 | Kurita | | B60L 3/00 701/32.8 |
| 2014/0095005 A1* | 4/2014 | Kanzaki | | B60L 11/1803 701/22 |
| 2015/0034406 A1* | 2/2015 | Hirose | | B60L 3/0046 180/279 |

FOREIGN PATENT DOCUMENTS

| | | |
|---|---|---|
| EP | 2556980 A2 | 2/2013 |
| EP | 2620315 A2 | 7/2013 |
| JP | 06-165523 | 6/1994 |
| JP | 2004-222361 A | 8/2004 |
| JP | 2005-143259 A | 6/2005 |
| JP | 2005-168235 | 6/2005 |
| JP | 2005-229689 A | 8/2005 |
| JP | 2006-224772 | 8/2006 |
| JP | 2007-116790 A | 5/2007 |
| JP | 2009-261196 A | 11/2009 |
| JP | 2012-50265 | 3/2012 |
| KR | 10-2012-0034451 A | 4/2012 |
| KR | 10-2012-0061437 A | 6/2012 |
| WO | WO 2011/104848 A1 | 9/2011 |
| WO | WO 2012/164680 A1 | 12/2012 |
| WO | WO 2013/125010 A1 | 8/2013 |

OTHER PUBLICATIONS

Extended European Search Report dated Mar. 15, 2016 in Corresponding European Patent Application No. 14187640.9.
European Office Action dated Nov. 2, 2017.
Japanese Office Action dated Oct. 3, 2017.
Chinese Office Action dated Dec. 4, 2017, of the corresponding Chinese Patent Application No. 201410513193.0.
European Office Action/Summons dated May 3, 2018, of the corresponding European Patent Application No. 14187640.9.
Office Action dated Aug. 14, 2018, of the corresponding Chinese Patent Application No. 201410513193.0.
Office Action dated Dec. 5, 2018, of the corresponding Chinese Patent Application No. 201410513193.0.

* cited by examiner

ELECTRIC VEHICLE POWER CONVERSION SYSTEM

CROSS-REFERENCE TO RELATED APPLICATION

Korean Patent Application No. 10-2014-0041286, filed on Apr. 7, 2014, and entitled, "Electric Vehicle Power Conversion System," and Japanese Patent Application No. 2013-208866, filed on Oct. 4, 2013, and entitled: "Electric Vehicle Power Conversion System," are incorporated by reference herein in their entirety.

BACKGROUND

1. Field

One or more embodiments described herein relate to an electric vehicle power conversion system.

2. Description of the Related Art

Various types of power conversion systems have been developed for electric vehicles. One type of power conversion system performs a retrogressive operation, which involves boosting a DC voltage from a main power supply, converting the DC voltage to an AC voltage, and outputting the AC voltage to a motor generator. This system may also perform a regenerative operation, which involves supplying regenerative power of the motor generator to the main power supply, auxiliary devices (e.g., electric power steering, an air conditioner, an ECU, etc.) of an electric vehicle, and/or a DC auxiliary power supply.

In such a system, when power conversion stops (e.g., as a result of an off-operation of an ignition key, a fault, or a vehicle collision or other accident), charges stored in a smoothing condenser, installed between electrodes located between a main circuit, may be forcibly (e.g., actively) discharged within a predetermined time. This forced discharge is performed so that an inter-terminal voltage of the smoothing condenser decreases to a safe voltage level.

In order to perform this operation, the switch element of a discharge circuit may be turned on to forcibly discharge the stored charges of the smoothing condenser through a resistor. However, when the discharge circuit fails, the forced discharge of the smoothing condenser is not performed and the inter-terminal voltage of the smoothing condenser may maintain an unsafe, high-voltage level, even after the predetermined time has elapsed.

SUMMARY

In accordance with one embodiment, an electric vehicle power conversion system includes a motor driving power system to output a DC voltage from a DC main power supply to a motor generator through an inverter circuit; and a control circuit to control the motor driving power system, wherein: the motor driving power system is to connect a smoothing condenser for smoothing the DC voltage, a resistor, and a semiconductor switch element in series, the motor driving power system includes an exclusive discharge circuit to discharge stored charge from the smoothing condenser, the control circuit includes a discharge controller to simultaneously turn on a first set of upper and lower arms when a failure of the exclusive discharge circuit is detected, the upper and lower arms including power semiconductors of the inverter circuit, and the discharge controller to discharge the stored charge from the smoothing condenser through parasitic resistance components of the upper and lower arms.

The discharge controller may detect the failure of the exclusive discharge circuit depending on whether or not an inter-terminal voltage of the smoothing condenser is able to be discharged to a target voltage within a predetermined time.

The motor driving power system may output the DC voltage from the DC main power supply to the motor generator through a voltage booster circuit and the inverter circuit; the discharge controller may simultaneously turn on a second set of upper and lower arms when a failure of the exclusive discharge circuit is detected, the first set of upper and lower arms including serial-connected power semiconductors of the voltage booster circuit, or to simultaneously turn on the first set of upper and lower arms including power semiconductors of the inverter circuit, and the discharge controller may discharge the stored charge from the smoothing condenser through parasitic resistance components of the second set of upper and lower arms of the voltage booster circuit or the first set of upper and lower arms of the inverter circuit.

The smoothing condenser may include a first smoothing condenser between the DC main power supply and the voltage booster circuit, and a second smoothing condenser between the voltage booster circuit and the inverter circuit.

In accordance with another embodiment, an apparatus includes an input coupled to a circuit; and a controller to control discharge of a smoothing condenser based on at least one signal received through the input, the at least one signal indicating failure of a discharge circuit configured to discharge the smoothing condenser, the controller to control discharge of stored charge in the smoothing condenser through parasitic resistance components of a power system which includes the smoothing condenser.

The failure of the discharge circuit may prevent the discharge circuit from discharging the smoothing condenser. The input may be an input of the controller. The controller may detect the failure from the signal when an inter-terminal voltage of the smoothing condenser is unable to be discharged to a target voltage within a predetermined time. The parasitic resistance components may be included in a voltage booster circuit.

The controller may control discharge of the stored charge in the smoothing capacitor independently from the discharge circuit having the failure. The controller may control discharge of the stored charge in the smoothing capacitor along a signal path that bypasses the discharge circuit. The power system may be a motor driving power system of a vehicle. The circuit may be a detector or an inverter.

In accordance with another embodiment, an apparatus includes a first discharge circuit; a second discharge circuit; and a controller to control discharge of a charge storage device through one of the first discharge circuit or the second discharge circuit, wherein the controller is to control discharge of the charge storage device through the first discharge circuit when the first discharge circuit does not have a failure and is to control discharge of the charge storage device through the second discharge circuit when the first discharge circuit has a failure, and wherein the charge storage device is discharged through the second discharge circuit along a path that bypasses the first discharge circuit.

The charge storage device may be a smoothing condenser. The controller may determine that the second discharge circuit has a failure when an inter-terminal voltage of the smoothing condenser is unable to be discharged through the first discharge circuit to a target voltage within a predetermined time.

The second discharge circuit may include parasitic resistance components of a power system, and the charge storage device may be discharged through the parasitic resistance components of the second discharge circuit when the first discharge circuit has a failure. The parasitic resistance components may be included in a voltage booster circuit.

The controller may detect the failure of the first discharge circuit when an inter-terminal voltage of the smoothing condenser is unable to be discharged to a target voltage within a predetermined time. The charge storage device may be coupled to a motor of an electric vehicle.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
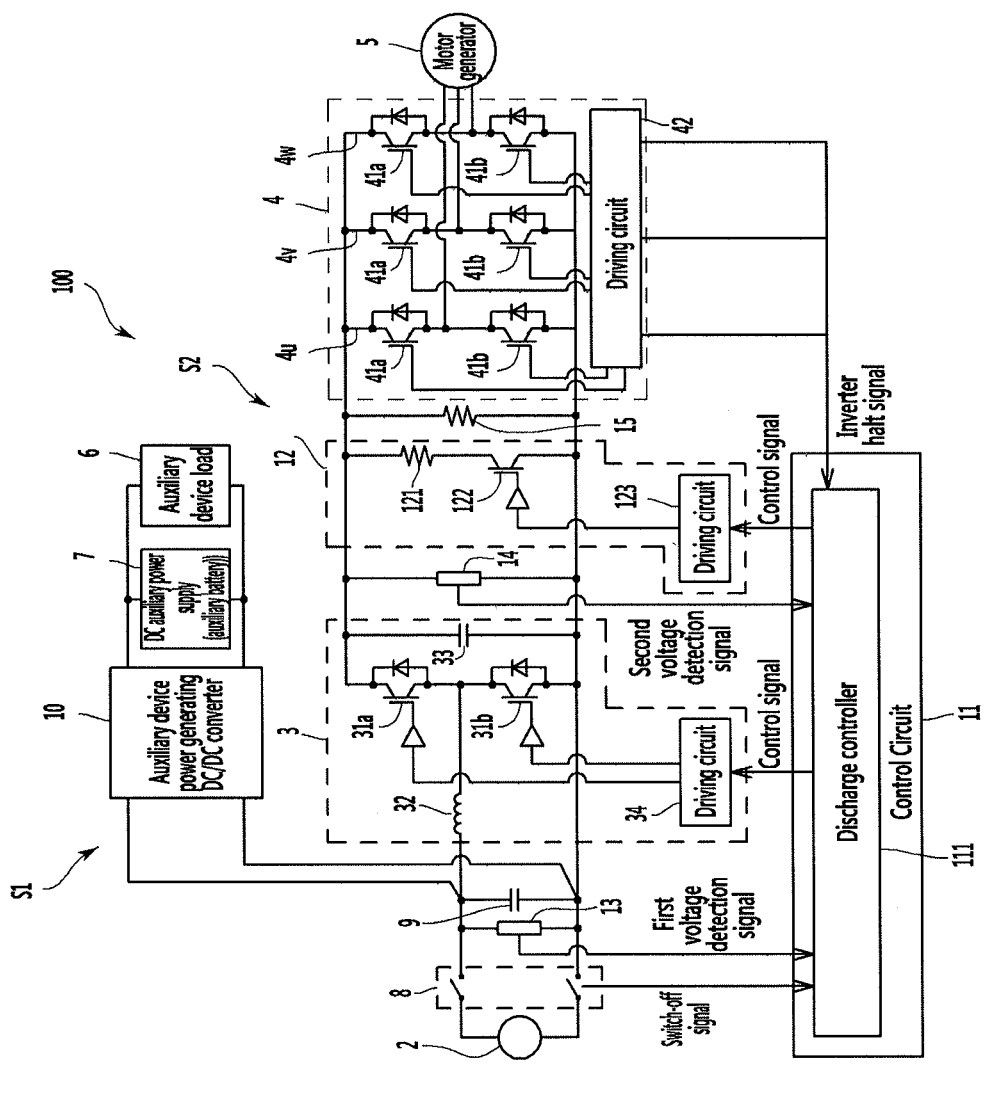
FIG. 1 illustrates an embodiment of an electric vehicle power conversion system.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Also, when it is described that an element is "coupled" to another element, the element may be "directly coupled" to the other element or "electrically coupled" to the other element through a third element.

FIG. 1 illustrates an embodiment of a power conversion system 100, which, for example, may be installed in an electrically driven vehicle, such as a hybrid vehicle or an electric vehicle. The power conversion system may retrogressively or regeneratively drive a motor generator 5. a parallel or split-type (serial-parallel type) or a serial type may be used as a type of the hybrid vehicle using the motor generator 5.

The power conversion system 100 performs a retrogressive operation and a regenerative operation. The retrogressive operation involves boosting a DC voltage from a DC main power supply 2 through a voltage booster circuit 3, converting the DC voltage into a three-phase AC voltage through an inverter circuit 4, and then outputting the AC voltage to the motor generator 5. The regenerative operation involves supplying regenerated power from the motor generator 5 through the inverter circuit 4 and the voltage booster circuit 3 to the DC main power supply 2, an auxiliary device 6, and/or a DC auxiliary power supply 7.

For example, the power conversion system 100 may include the DC main power supply 2 (e.g., a 48 V lithium-ion battery), electrical circuit switches (e.g., DC contactors) 8 for closing/opening electrical circuits respectively connected to output terminals of the DC main power supply 2, a first smoothing condenser (e.g., DC link condenser) 9 between the switches 8, an auxiliary device power system S1 connected via the first smoothing condenser 9 and supplying power to each of auxiliary devices 6 of the vehicle (e.g., electrically-controlled power steering, an air-conditioner, an ECU) and the DC auxiliary power supply 7 (e.g., a 12 V/24 V battery), and a motor driving power system S2 connected in parallel with the auxiliary device power system S1 via the first smoothing condenser 9 and configured to retrogressively or regeneratively drive the motor generator 5. The first smoothing condenser 9 may be included in the motor driving power system S2.

The auxiliary device power system S1 includes a DC/DC converter 10. The respective auxiliary devices 6 and the DC auxiliary power supply 7 are connected in parallel at output terminals of the DC/DC converter 10.

The motor driving power system S2 includes the voltage booster circuit 3 for voltage-converting the DC voltage from the DC main power supply 2. The inverter circuit 4 converts a DC voltage output from the voltage booster circuit 3 to an AC voltage for output to the motor generator 5.

The voltage booster circuit 3 includes power semiconductors 31a and 31b (e.g., an IGBT, a MOSFET, etc.), a reactor 32, and a second smoothing condenser 33. The voltage booster circuit 3 includes upper and lower arms 31a and 31b that include serial-connected power semiconductors. A positive terminal of the inverter circuit 4 is connected to a semiconductor terminal (e.g., a collector terminal or drain terminal) of the upper arm 31a. A negative terminal of the DC main power supply 2 is connected to a semiconductor terminal (e.g., an emitter terminal or source terminal) of the lower arm 31b.

The second smoothing condenser 33 is connected between the semiconductor terminals of the upper and lower arms 31a and 31b. The smoothing condenser 33 may be connected in parallel with the upper and lower arms 31a and 31b at output terminals of the voltage booster circuit 3.

One terminal of the reactor 32 is connected between the other terminal of the upper arm 31a (emitter terminal or source terminal) and the other terminal of the lower arm 31b (collector terminal or drain terminal), e.g., at a serial connection point therebetween. The other terminal the reactor 32 may be connected to the positive terminal of the DC main power supply 2. Alternatively, the upper and lower arms 31a and 31b of the voltage booster circuit 3 may be configured such that free-wheeling diodes are inversely connected in parallel.

The voltage booster circuit 3 is provided with a driving circuit 34 for driving the upper and lower arms 31a and 31b. The driving circuit 34 allows the upper and lower arms 31a and 31b to be alternately switched based on a predetermined duty ratio, such that the reactor 32 is charged and discharged to deliver power in a retrogressive (boosting) direction or regenerative (bucking) direction. The driving circuit 34 receives a driving command signal (control signal) from a control circuit 11.

The second smoothing condenser 33 is installed in the voltage booster circuit 3 and functions as a smoothing condenser at input terminals of the inverter circuit 4. For example, the second smoothing condenser 33 is commonly used by the voltage booster circuit 3 and the inverter circuit 4.

The inverter circuit 4 includes three-phase bridge circuits 4u, 4v, and 4w and a driving circuit 42. The three-phase bridge circuits 4u, 4v, and 4w include serial-connected upper and lower arms 41a and 41b connected in parallel. The driving circuit 42 drives the upper and lower arms 41a and 41b of respective ones of the bridge circuits 4u, 4v, and 4w.

The upper and lower arms 41a and 41b include power semiconductors such as an IGBT, a MOSFET, etc. The driving circuit 42 receives a driving command signal (control signal) from a control circuit 11. The auxiliary device power system S1 and the motor driving power system S2 are controlled by the control circuit 11.

To perform the retrogressive/regenerative power control required for operation of the electric vehicle, the control circuit 11 generates driving command signals for each power semiconductor, while taking an optimal power linkage to the voltage booster circuits 3 and the inverter circuit 4 based on a required operation command from an overall controller (e.g., upper ECU). The control circuit 11 may transfer the driving command signals for the corresponding power semiconductor to each driving circuit as a switching command.

Accordingly, power conversion system 100 performs a retrogressive operation of boosting the DC voltage of the DC main power supply 2 through the voltage booster circuit 3, converting the DC voltage to an AC voltage through the inverter circuit 4, and outputting the AC voltage to the motor generator 5. The power conversion system 100 performs a regenerative operation of supplying the regenerative power of the motor generator 5 to the DC main power supply 2, the auxiliary device 6 of the vehicle, and the DC auxiliary power supply 7 via the inverter circuit 4 and voltage booster circuit 3.

The control circuit 11 may be configured to be physically divided to respectively correspond to the voltage booster circuit 3 and the inverter circuit 4, or may be commonly used and integrally formed to reduce the number of parts for cost reduction.

In the power conversion system 100 of the present embodiment, the motor driving power system S2 includes an exclusive discharge circuit 12 for discharging stored charges from each of the smoothing condensers 9 and 33. Reference numeral 15 illustrated in FIG. 1 refers to a self-discharge resistor.

The exclusive discharge circuit 12 connects a resistor 121 and a semiconductor switch element 122 (e.g., an IGBT, a MOSFET, etc.) in series, and is disposed between main circuit electrodes of the power conversion system 100 while being connected therebetween. For example, the exclusive discharge circuit 12 may be disposed between the voltage booster circuit 3 and the inverter circuit 4, and may be installed between the main circuit electrodes while being connected therebetween.

The exclusive discharge circuit 12 includes a driving circuit 123 for driving the semiconductor switch element 122. The driving circuit 123 turns on the semiconductor switch element 122 to perform a discharge function of the exclusive discharge circuit 12. Also, the driving circuit 122 receives a driving command signal (control signal) from the control circuit 11.

The control circuit 11 of the present embodiment includes a discharge controller 111 for discharging the stored charges from the smoothing condensers 9 and 33 through the exclusive discharge circuit 12 or voltage booster circuit 3. The control circuit 11 may be an exclusive or general purpose computer circuit including a CPU, a memory, an I/O interface, an AD converter, etc., and may control the functions of the discharge controller 111 depending on a control program stored in a memory.

For example, the discharge controller 111 may perform a fault detection function for detecting the fault of the exclusive discharge circuit 12. The discharge controller 111 may change the discharge circuit for the stored charges in the smoothing condensers 9 and 33 to the exclusive discharge circuit 12 and the voltage booster circuit 3, depending on whether a fault of the exclusive discharge circuit 12 occurs.

In terms of signaling, the discharge controller 111 may receive a signal indicating a halt of the power conversion system 100 (e.g., an inverter halt signal indicating a halt of the inverter circuit 4), may simultaneously receive a switch-off signal indicating an off-state (blocked) of the electrical switch 8, and may start a discharge process of the smoothing condensers 9 and 33.

The discharge controller 111 receives a first voltage detection signal from a first voltage detector 13 located between the electrical circuit switches 8 and the voltage booster circuit 3. The first voltage detector 13 detects an inter-terminal voltage of the first smoothing condenser 9.

Simultaneously, the discharge controller 111 receives a second voltage detection signal from a second voltage detector 14 located between the voltage booster circuit 3 and the inverter circuit 4d. The second voltage detector 14 detects an inter-terminal voltage of the second smoothing condenser 33.

The discharge controller 111 uses the first and second voltage detection signals to detect whether or not a fault of the exclusive discharge circuit 12 exists. The discharge controller 111 discharges the smoothing condensers 9 and 33 through the exclusive discharge circuit 12 if a fault of the exclusive discharge circuit 12 has not occurred, and discharges the smoothing condensers 9 and 33 through the upper and lower arms 31a and 31b of the voltage booster circuit 3 and the upper and lower arms 41a and 41b of the inverter circuit 4 if the fault of the exclusive discharge circuit 12 has occurred.

Hereinafter, an embodiment of a method in which the discharge controller 111 detects the fault of the exclusive discharge circuit 12 will be described. The discharge controller 111 detects whether or not a fault exists in the exclusive discharge circuit 12 based on a fault detection time Tc and a target value Vc. The fault detection time Tc indicates a predetermined time after a preset forced discharge starts. The target value Vc is a target value of the inter-terminal voltage of the second smoothing condenser 33 after the fault detection time Tc elapses. The discharge controller 111 detects that a fault of the exclusive discharge circuit 12 exists if discharge to the target value Vc does not occur within the fault detection time Tc.

Because the inter-terminal voltage of the second smoothing condenser 33 is greater than that of the first smoothing condenser 9, and the inter-terminal voltage of the second smoothing condenser 33 decreases first by the forced discharge start, the inter-terminal of the second smoothing condenser 33 may be used to detect a fault.

For example, the inter-terminal voltages of the second smoothing condenser 33 may be detected at predetermined time intervals (e.g., 0.1 second intervals) until the fault detection time Tc elapses. A fault may be determined to exist depending on whether the inter-terminal voltage can be discharged to the target value Vc.

In this case, the target value Vc of the inter-terminal voltage after the fault detection time Tc elapses may be determined by an inter-terminal voltage vs. discharge-time characteristic curve of the second smoothing condenser 33 resulting from the forced discharge start. Alternatively, the fault detection of the exclusive discharge circuit 12 may be determined from variations such as a decreasing rate, a decreasing amount, or the like, of the inter-terminal voltage in the fault detection time Tc.

Figure 2:
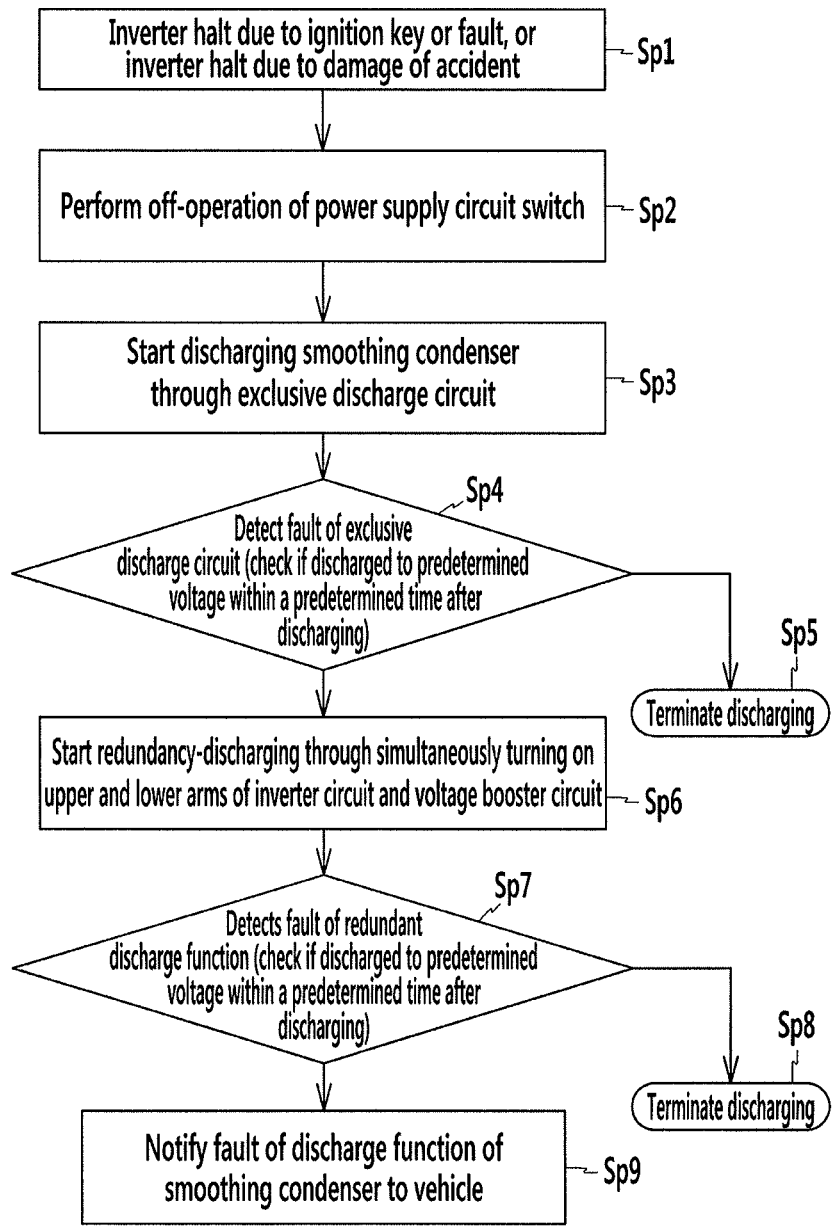
FIG. 2 illustrates an embodiment of a discharge process performed by a discharge controller.
Figure 3:
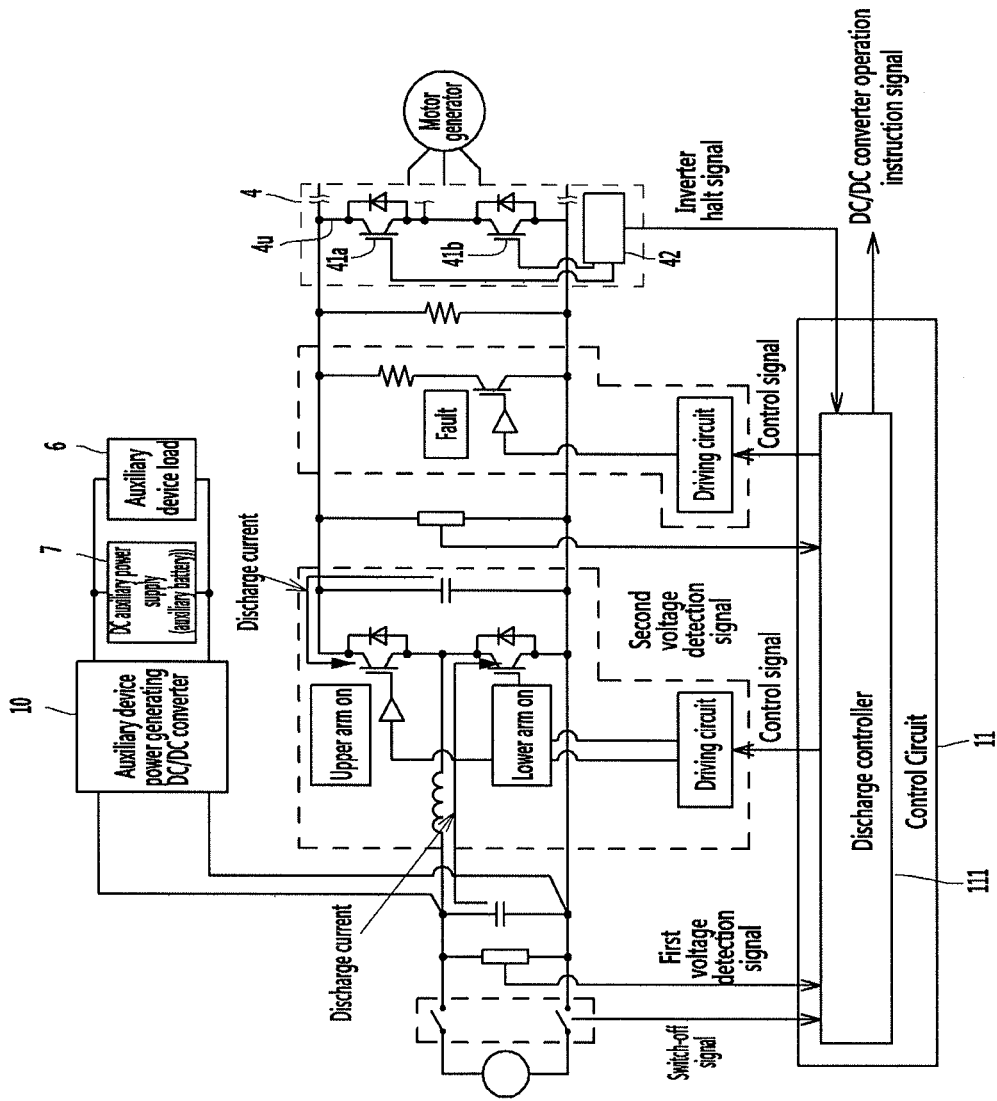
FIG. 3 illustrates an embodiment of a discharge process through an auxiliary device power system.

FIGS. 2 and 3 illustrate a function of the discharge controller 111 and a discharging process of the power conversion system 100 through the smoothing condensers 9 and 33 according to one embodiment.

First, the discharge controller 111 receives an inverter halt signal from the inverter circuit 4. The inverter halt signal may be received, for example, when an ignition key of the vehicle is turned off or the power conversion system 100 is halted by a fault (e.g., some defective condition of the vehicle and/or one of its systems) or an accident such as a car crash (Sp1).

In addition, the discharge controller 111 receives a switch-off signal that indicates an off-operation of the electrical circuit switches 8 when the power conversion system 100 is halted (Sp2). Alternatively, the off-operation of the electrical circuit switches 8 may be performed by the discharge controller 111.

After the inverter halt signal and the switch-off signal are received, the discharge controller 111 starts discharging the smoothing condensers 9 and 33 through the exclusive discharge circuit 12 (Sp3). For example, the discharge controller 111 simultaneously outputs a driving command signal (control signal) for turning on only the upper arm 31a of the voltage booster circuit 3, while outputting a driving command signal (control signal) for turning on the semiconductor switch element 122 to the driving circuit 123 of the exclusive discharge circuit 12. Accordingly, the charges in the first and second smoothing condensers 9 and 33 are discharged through the resistor 121 of the exclusive discharge circuit 12.

The second smoothing condenser 33 has the greater inter-terminal voltage, and is discharged first through the exclusive discharge circuit 12. The first and second smoothing condensers 9 and 33 are discharged together after the inter-terminal voltage of the second smoothing condenser 33 is equal to that of first smoothing condenser 9.

The discharge controller 111 receives the voltage detection signals from the respective voltage detection units 13 and 14 at the same time, when starting discharge through the exclusive discharge circuit 12. The discharge controller 111 determines whether or not a fault of the exclusive discharge circuit 12 exists depending on whether the inter-terminal voltage can be discharged to the target value Vc within the fault detection time Tc (Sp4). For example, the discharge controller 111 detects a fault of the exclusive discharge circuit 12 if the inter-terminal voltage of the second smoothing condenser 33 is not discharged to the target value Vc within the fault detection time Tc.

The discharge controller 111 continues discharging if the inter-terminal voltage of the second smoothing condenser 33 can be discharged to the target value Vc within the fault detection time Tc, e.g., if the fault of the exclusive discharge circuit 12 has not occurred. The discharge controller 111 terminates discharging when the inter-terminal voltage reaches a predetermined safety voltage, e.g., the target value Vd, within an allowed discharge time Td (Sp5).

In contrast, the discharge controller 111 starts discharging the smoothing condensers 9 and 33 through the voltage booster circuit 3 if the inter-terminal voltage of the second smoothing condenser 33 is not discharged to the target value Vc within the fault detection time Tc, e.g., if a fault of the exclusive discharge circuit 12 has occurred (Sp6). For example, as shown in FIG. 3, the discharge controller 111 outputs a driving command signal (control signal) for simultaneously turning on the upper and lower arms 31a and 31b of the voltage booster circuit 3 and/or the upper and lower arms 41a and 41b of the inverter circuit 4. Accordingly, the stored charges in the second and first smoothing condensers 33 and 9 are discharged through parasitic resistance components of the upper and lower arms 31a and 31b and/or the upper and lower arms 41a and 41b.

The second smoothing condenser 33 has the greater inter-terminal voltage and is discharged first through the voltage booster circuit 3. The first and second smoothing condensers 9 and 33 are discharged together after the inter-terminal voltage of the second smoothing condenser 33 is equal to that of the first smoothing condenser 9.

Discharging through the upper and lower arms 41a and 41b of the inverter circuit 4 may simultaneously turn on all the upper and lower arms 41a and 41b of the three-phase bridge circuits 4u, 4v, and 4w, or the upper and lower arms 41a and 41b of any single phase bridge circuit.

Similar to discharging through the exclusive discharge circuit 12 described above, together with the starting discharging through the voltage booster circuit 3, the discharge controller 111 receives the voltage detection signals from the respective voltage detection units 13 and 14, and detects whether or not a fault of discharging through the voltage booster circuit 3 and the inverter circuit 4 occurs depending on whether the inter-terminal voltage can be discharged to a target value Vc' within a fault detection time Tc' (Sp7).

The fault detection time Tc' and the target value Vc' of discharging through the voltage booster circuit 3 and the inverter circuit 4 may be the same as or different from the fault detection time Tc and the target value Vc of the discharging through the exclusive discharge circuit 12.

The discharge controller 111 detects the fault of the discharging through the voltage booster circuit 3 and the inverter circuit 4 depending on whether or not the inter-terminal voltage of the first smoothing condenser 9 can be discharged to a target value Vc1' within a fault detection time Tc1', and whether or not the inter-terminal voltage of the second smoothing condenser 33 can be discharged to a target value Vc2' within a fault detection time Tc2'.

The discharge controller 111 continues discharging if the inter-terminal voltages of the smoothing condensers 9 and 33 can be discharged to the target value Vc' within the fault detection time Tc', e.g., if a fault of discharging through the voltage booster circuit 3 has not occurred. The discharge controller 111 terminates discharging after being discharged to the target value Vd within the allowed discharge time Td, e.g., the safety voltage (Sp8).

The fault detection time Tc of the exclusive discharge circuit 12, the fault detection time Tc' of the discharging through the voltage booster circuit 3, and the discharging time through the voltage booster circuit 3 may add to a value less than the allowed discharge time Td.

Once a fault of the exclusive discharge circuit 12 is detected to perform the discharging through the voltage booster circuit 3, the discharge controller 111 directly performs discharging through the voltage booster circuit 3, while omitting detecting of the exclusive discharge circuit 12.

In contrast, if one of the inter-terminal voltages of the first or second smoothing condensers 9 and 33 is not discharged to the target value Vc' within the fault detection time Tc' (e.g., if the fault of the discharging through the voltage booster circuit 3 has occurred), the discharge controller 111 terminates discharging and notifies the fault state of the discharging function of the power conversion system 100, e.g., to a driver via a display, a speaker, etc. in the vehicle (Sp9).

According to this embodiment of the vehicle power conversion system 100, because the discharge controller 111 detects a fault of the exclusive discharge circuit 12, the discharge controller 111 allows the stored charges of the smoothing condensers 9 and 33 to be discharged through the exclusive discharge circuit 12 as usual if the fault of the exclusive discharge circuit 12 does not occur. Thus, the respective inter-terminal voltages of the smoothing condensers 9 and 33 can be discharged to a safe value within a predetermined time.

In addition, when a fault of the exclusive discharge circuit 12 has occurred, the discharge controller 111 can simultaneously turn on the upper and lower arms 31a and 31b of the voltage booster circuit 3 and the upper and lower arms 41a and 41b of the inverter circuit 4. Thus, the stored charges in the smoothing condensers 9 and 33 are discharged through the parasitic resistance components of the voltage booster circuit 3 and the inverter circuit 4, and the inter-terminal voltages of the smoothing condensers 9 and 33 are decreased to the predetermined safe value within the predetermined time.

Because the upper and lower arms 31a and 31b of the voltage booster circuit 3 and the upper and lower arms 41a and 41b are used, no additional circuit or part is required. Also, the stored charges of the smoothing condensers 9 and 33 can be discharged through the existing circuit, and the discharging function of the smoothing condensers 9 and 33 can be redundantly provided.

In addition, when a fault of the exclusive discharge circuit 12 has occurred, the discharge controller 111 may discharge the stored charges from the smoothing condensers 9 and 33 through a maximum of four redundant discharge devices or paths.

For example, the stored charges may be discharged through (1) a redundant discharge device or path using the upper and lower arms 31a and 31b of the voltage booster circuit 3, (2) the upper and lower arms 41a and 41b of the bridge circuit 4u of the inverter circuit 4, (3) the upper and lower arms 41a and 41b of the bridge circuit 4v of the inverter circuit 4, and (4) the upper and lower arms 41a and 41b of the bridge circuit 4w of the inverter circuit 4.

In an alternative embodiment, the discharge controller 111 may detect a fault of the exclusive discharge circuit 12 using the inter-terminal voltage of the second smoothing condenser 33, using the inter-terminal voltage of the first smoothing condenser 9, or both of the inter-terminal voltages of the first and second smoothing condensers 9 and 33. In this case, the discharge controller 111 may detect a fault after the inter-terminal voltage of the first smoothing condenser 9 is equal to that of the second smoothing condenser 33.

Alternatively, the motor driving power system S2 may have a configuration in which the voltage booster circuit 3 is not included and the DC main power supply 2 is directly connected to the inverter circuit 4. In this case, when a fault of the exclusive discharge circuit 12 has occurred, the discharge controller 111 may simultaneously turn on the upper and lower arms 31a and 31b of the voltage booster circuit 3 and the upper and lower arms 41a and 41b of the inverter circuit 4. As a result, the stored charges in the smoothing condensers 9 and 33 are discharged through the parasitic resistance components of the voltage booster circuit 3 and the inverter circuit 4.

Accordingly, even if the voltage booster circuit 3 is not included, the inter-terminal voltages of the smoothing condensers 9 and 33 may be decreased to a predetermined safe value within the predetermined time.

Alternatively, the motor driving power system S2 may be configured such that it is not installed with the exclusive discharge circuit 12. In this case, the discharge controller 111 performs the control sequences after operation Sp6 while omitting operations Sp1 to Sp5. Accordingly, even if the motor driving power system S2 is not installed with the exclusive discharge circuit 12, the discharge controller 111 may discharge the stored charges from the smoothing condensers 9 and 33.

Figure 5:
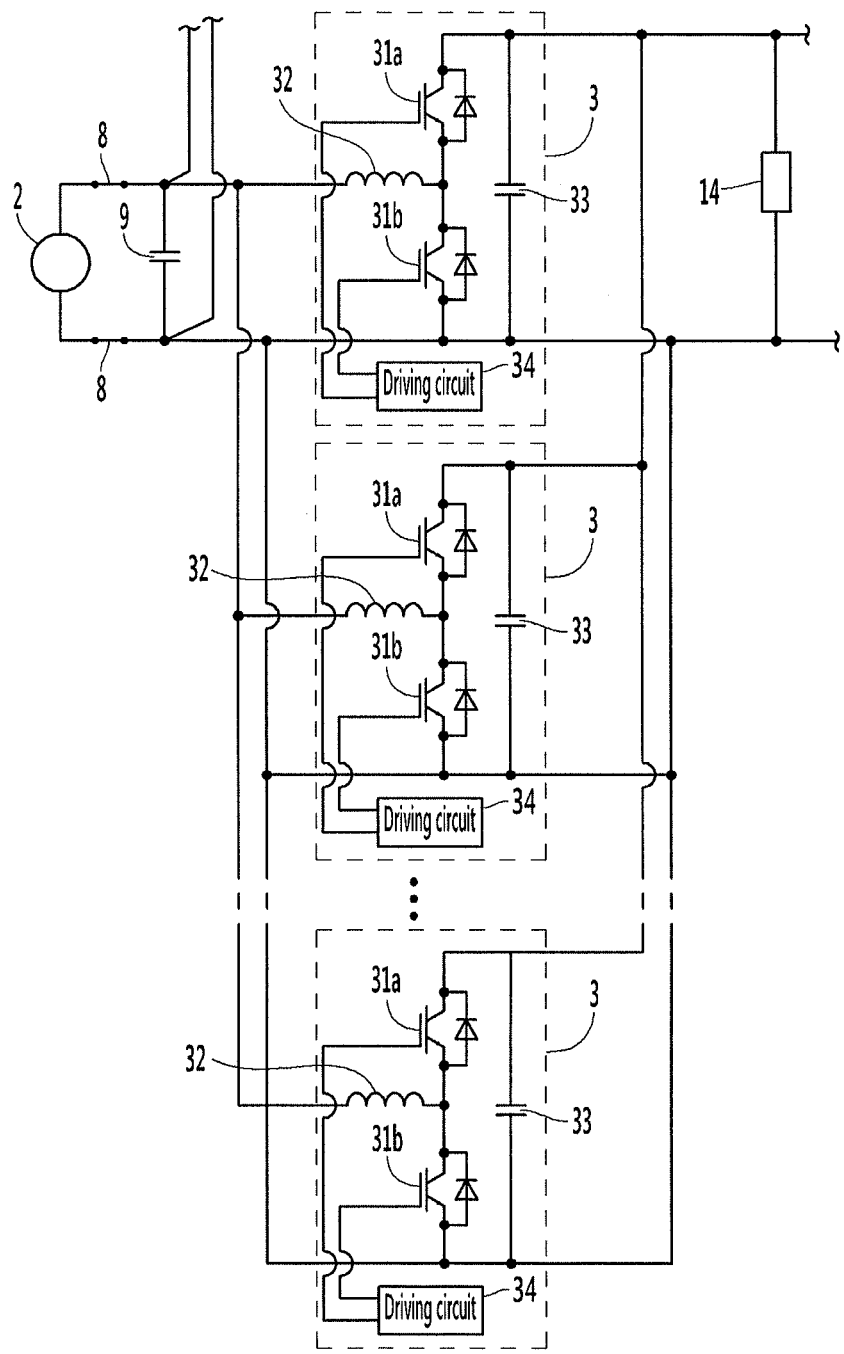
FIG. 5 illustrates an embodiment including a plurality of voltage booster circuits connected in parallel.

Alternatively, as shown in FIG. 5, a plurality of voltage booster circuits 3 may be simultaneously connected in parallel with the DC main power supply 2, while each of the parallel-connected voltage booster circuits 3 may be independently provided with the driving circuit 34.

When a fault occurs in at least one of the voltage booster circuits 3, the control circuit 11 outputting the control signal to the driving circuit 34 may be configured to halt the operation of the faulty voltage booster circuit 3, set a power control value according to the number of the remaining normal voltage booster circuits 3, and control the remaining normal voltage booster circuits 3 and the inverter circuit 4 according to the power control value. Because the plurality of voltage booster circuits 3 are installed in parallel, redundancy of the power conversion system 100 may be improved.

In such a configuration without an alternator, because the plurality of voltage booster circuits 3 are installed in parallel, reliable power supply to the DC main power supply 2, the auxiliary device 6 of the electric vehicle 6, and the DC auxiliary power supply 7 are guaranteed.

Further, the plurality of voltage booster circuits 3 are installed in parallel. Thus, the current may be distributed to each of the voltage booster circuits 3. As a result, efficiency enhancement (such as the high-efficiency voltage booster circuits 3), reduced size, and longer lifespan of the parts may be achieved.

When a fault occurs in at least one of the voltage booster circuits 3, the discharge controller 111 may set a power limiting value according to the number of remaining normal voltage booster circuits 3, and may control the remaining normal voltage booster circuits 3 and the inverter circuit 4 according to the power limit value. As a result, power-limited operation of the motor generator 5 may continue to charge regenerative power to the DC main power supply 2, the auxiliary device 6 of the vehicle, and the DC auxiliary power supply 7 even after some of the voltage booster circuits 3 fail. Accordingly, a limp-home mode system may be implemented, thereby making it possible to safely evacuate a driver by allowing the driver to take the vehicle to a repair shop.

In addition, because the smoothing condensers 33 are installed at output terminals of the parallel-connected voltage booster circuits 3, each smoothing condenser 33 may function as the smoothing condenser to the input terminals of inverter circuit 4.

As described above, because the smoothing condensers 33 are installed at output terminals of the parallel-connected voltage booster circuits 3, a ripple current may be reduced by the current distribution in charging/discharging the smoothing condenser 33 when receiving/transmitting power from/to the inverter circuit 4. Also, a reduced size of the smoothing condenser 33 or reduction in power loss thereof may be achieved, and performance may be improved.

Alternatively, the number of redundant discharge devices or paths may be increased according to the increased number of voltage booster circuits 3.

Figure 4:
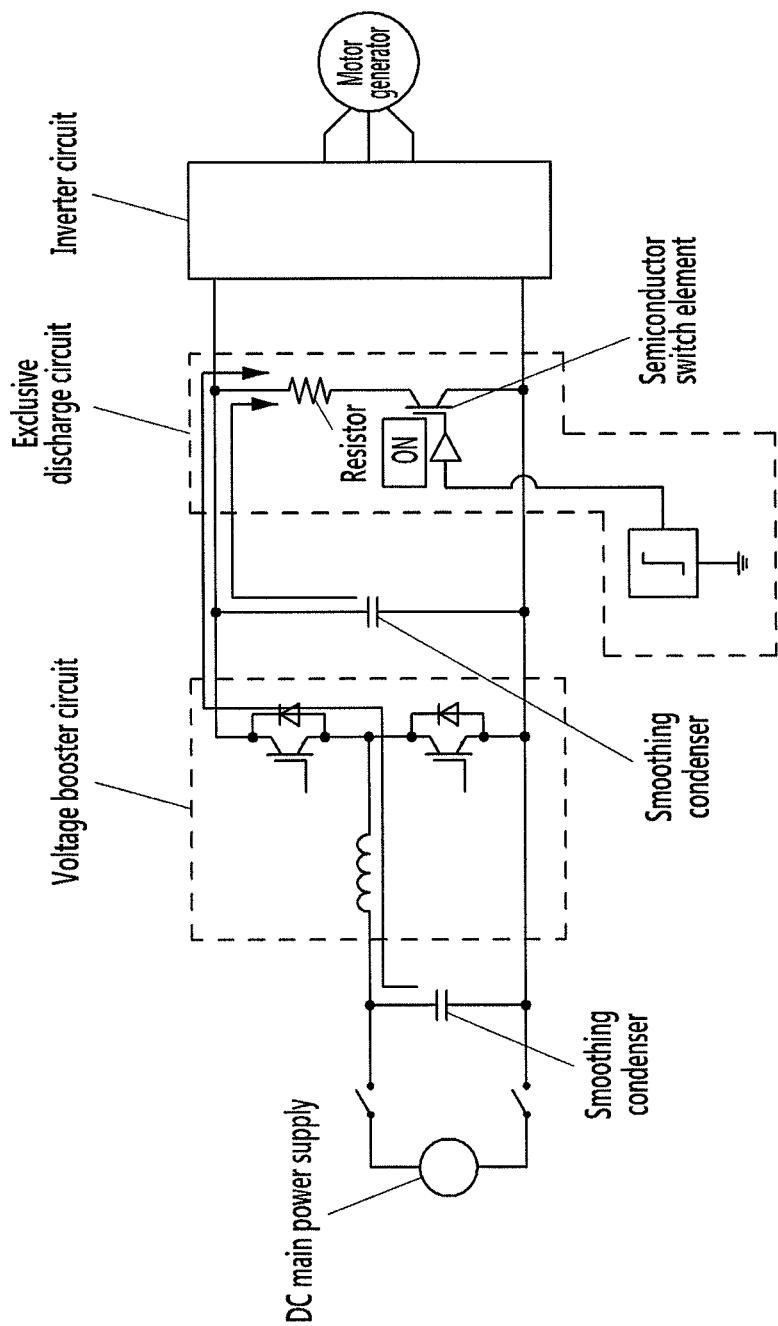
FIG. 4 illustrates a discharge process through one type of exclusive discharge circuit.

By way of summation and review, discharge circuits may be used in an electric vehicle to forcibly discharge the stored charges in a smoothing condenser through a resistor. For example, as illustrated in FIG. 4, an exclusive discharge circuit connects a resistor and a semiconductor switch element, which is connected between the electrodes of a main circuit. A switch for opening/closing an electrical circuit connected to output terminals of a DC main power supply is then blocked. Then, a switch element of a discharge circuit is turned on to forcibly discharge stored charge of the smoothing condenser through a resistor.

However, when the discharge circuit fails, the forced discharge of the smoothing condenser is not performed and the inter-terminal voltage of the smoothing condenser may maintain an unsafe, high-voltage level, even after the predetermined time has elapsed.

In accordance with one or more of the aforementioned embodiments, an electric vehicle power conversion system includes a discharge circuit that can reliably discharge stored charges from a smoothing condenser, even when a primary discharge circuit fails.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An electric vehicle power conversion system, comprising:
    a motor driving power system to output a DC voltage from a DC main power supply to a motor generator through a voltage booster circuit and an inverter circuit; and
    a control circuit to control the motor driving power system, wherein:
    the motor driving power system includes a first smoothing condenser for smoothing the DC voltage, a second smoothing condenser between the voltage booster circuit and the inverter circuit, and an exclusive discharge circuit which includes a resistor connected to a semiconductor switch element in series, the exclusive discharge circuit to discharge stored charge from the first smoothing condenser and the second smoothing condenser,
    the control circuit includes a discharge controller to simultaneously turn on a first set of upper and lower arms when a failure of the exclusive discharge circuit is detected, the upper and lower arms including power semiconductors of the inverter circuit, and
    the discharge controller to discharge the stored charge from the first smoothing condenser and the second smoothing condenser through the voltage booster circuit and through parasitic resistance components of the upper and lower arms.

2. The system as claimed in claim 1, wherein the discharge controller is to detect the failure of the exclusive discharge circuit depending on whether or not an inter-terminal voltage of the second smoothing condenser is able to be discharged to a target voltage within a predetermined time.

3. The system as claimed from claim 1, wherein:
    the discharge controller is to simultaneously turn on a second set of upper and lower arms when a failure of the exclusive discharge circuit is detected, the second set of upper and lower arms including serial-connected power semiconductors of the voltage booster circuit, and to simultaneously turn on the first set of upper and lower arms including power semiconductors of the inverter circuit, and
    the discharge controller is to discharge the stored charge from the first smoothing condenser through parasitic resistance components of the second set of upper and lower arms of the voltage booster circuit and the first set of upper and lower arms of the inverter circuit.

4. The system as claimed in claim 3, wherein:
    the first smoothing condenser is between the DC main power supply and the voltage booster circuit.

5. An apparatus, comprising:
    an input coupled to a circuit including a voltage booster circuit, a discharge circuit, and an inverter circuit; and
    a controller to control discharge of a smoothing condenser between the voltage booster circuit and the inverter circuit based on at least one signal received through the input, the at least one signal indicating failure of the discharge circuit that is to discharge the smoothing condenser, the controller to control discharge of stored charge in the smoothing condenser through the voltage booster circuit and parasitic resistance components of a power system which includes the smoothing condenser.

6. The apparatus as claimed in claim 5, wherein the failure of the discharge circuit prevents the discharge circuit from discharging the smoothing condenser.

7. The apparatus as claimed in claim 5, wherein the input is an input of the controller.

8. The apparatus as claimed in claim 5, wherein the controller is to detect the failure from the signal when an inter-terminal voltage of the smoothing condenser is unable to be discharged to a target voltage within a predetermined time.

9. The apparatus as claimed in claim 5, wherein the voltage booster circuit includes parasitic resistance components to discharge the smoothing condenser.

10. The apparatus as claimed in claim 5, wherein the controller is to control discharge of the stored charge in the smoothing condenser independently from the discharge circuit having the failure.

11. The apparatus as claimed in claim 5, wherein the controller is to control discharge of the stored charge in the smoothing condenser along a signal path that bypasses the discharge circuit.

12. The apparatus as claimed in claim 5, wherein the power system is a motor driving power system of a vehicle.

13. The apparatus as claimed in claim 5, wherein the circuit is a detector or an inverter.

\* \* \* \* \*